ary Examiner, Agent, or Firm—Antonelli, Terry & Wands

United States Patent [19]
Kato et al.

[11] Patent Number: 4,755,047
[45] Date of Patent: Jul. 5, 1988

[54] PHOTOMETRIC STEREOSCOPIC SHAPE MEASURING METHOD

[75] Inventors: Makoto Kato, Kawasaki; Tetsuo Yokoyama; Kaoru Momose, both of Tokyo; Toshihiro Furuya, Katsuta, all of Japan

[73] Assignee: Hitachi, Ltd., Tokyo, Japan

[21] Appl. No.: 916,703

[22] Filed: Oct. 8, 1986

[30] Foreign Application Priority Data
Oct. 8, 1985 [JP] Japan .................................. 60-224020

[51] Int. Cl.⁴ ............................................. G01B 11/00
[52] U.S. Cl. ....................................... 356/376; 356/2; 250/558
[58] Field of Search ...................... 356/1, 2, 372, 376, 356/377; 250/558, 560

[56] References Cited
U.S. PATENT DOCUMENTS
4,269,513  5/1981  DiMatteo et al. ............. 250/558 X Primary Examiner—Gene Wan
Assistant Examiner—Robert J. Pascal
Attorney, Agent, or Firm—Antonelli, Terry & Wands

[57] ABSTRACT

Method of determining stereoscopic geometry of an object through photometric stereoscopic measurement with high accuracy. Three or more images of the object picked up in a same fixed direction by varying the state of light sources are derived. Relationships among the images are corrected so that an evaluation function determined by making use of redundancy of the images assumes a minimum value, to thereby prepare a reflectance map to be used in determining orientations of surface elements of the object. Through integration of the orientations, the surface shape of the object is determined. The method is applicable to the image processing in a scanning electron microscope.

4 Claims, 8 Drawing Sheets

PHOTOMETRIC STEREOSCOPIC SHAPE MEASURING METHOD

BACKGROUND OF THE INVENTION

The present invention generally relates to a photometric stereoscopic shape measuring method. More particularly, the invention concerns a photometric stereoscopic shape measuring method which is capable of automatically correcting a reflectance map for assuring high accuracy for the stereoscopic measurement of a surface geometry of a specimen in a scanning electron microscope (hereinafter also referred to simply as SEM).

As a method of obtaining three dimensional information of an object, a stereoscopic measuring method has heretofore been adopted according to which corresponding points between two images picked up from two different points of sight are determined, wherein the three dimensional information is derived by processing appropriately the parallax errors. Effectiveness of such stereoscopic measurement is demonstrated in the preparation of topographical maps based on air photographs, by way of example. However, determination of the corresponding points between the two images involves a procedure which is time consuming. In the stereoscopic measurement of a specimen in an SEM, two images of the specimen are obtained by tilting a specimen table. At that time, manipulation such as readjustment of the focal point is required.

On the other hand, studies concerning acquisition of three-dimensional information have been intensively conducted in recent years from different standpoints. As a typical one, there may be mentioned a photometric stereoscopic shape measuring method. By way of example, this method is disclosed in K. Ikeuchi's article "Determining 3D Shape from 2D Shading Information Based on the Reflectance Map Technique" contained in "Periodical Collection of Articles" published by The Institute of Electronics and Communication Engineers of Japan, Vol. J65-D, No. 7 (1982/7), p.p. 842-849. As is discussed in this article, according to this photometric stereoscopic shape measuring method, an object under observation and the observation point are fixed in respect to their respective positions, wherein the direction in which the object is illuminated by a light source is varied to pick up a plurality of images. Since the positional relationship between the observation point and the object is fixed, the positional collation of the corresponding points usually required in the conventional stereoscopic measurements is rendered unnecessary. In in the case of the SEM, the direction in which a secondary electron detector is orientated coincides with the direction of illumination by the light sources in an optical system. Accordingly, by providing a plurality of detectors, it is possible to obtain a plurality of images simultaneously at one time.

The processing involved in carrying out the photometric stereoscopic shape measuring method may be generally classified into three steps, i.e. (a) inputting or loading of a plurality of images; (b) determination of inclinations of individual surface elements on the basis of brightness of individual picture elements or pixels of the images; and (c) determination of a stereoscopic shape through integration or the like processing of inclinations of the individual surface elements determined through the processing step (b). This processing will be described below in some detail.

Figure 2:
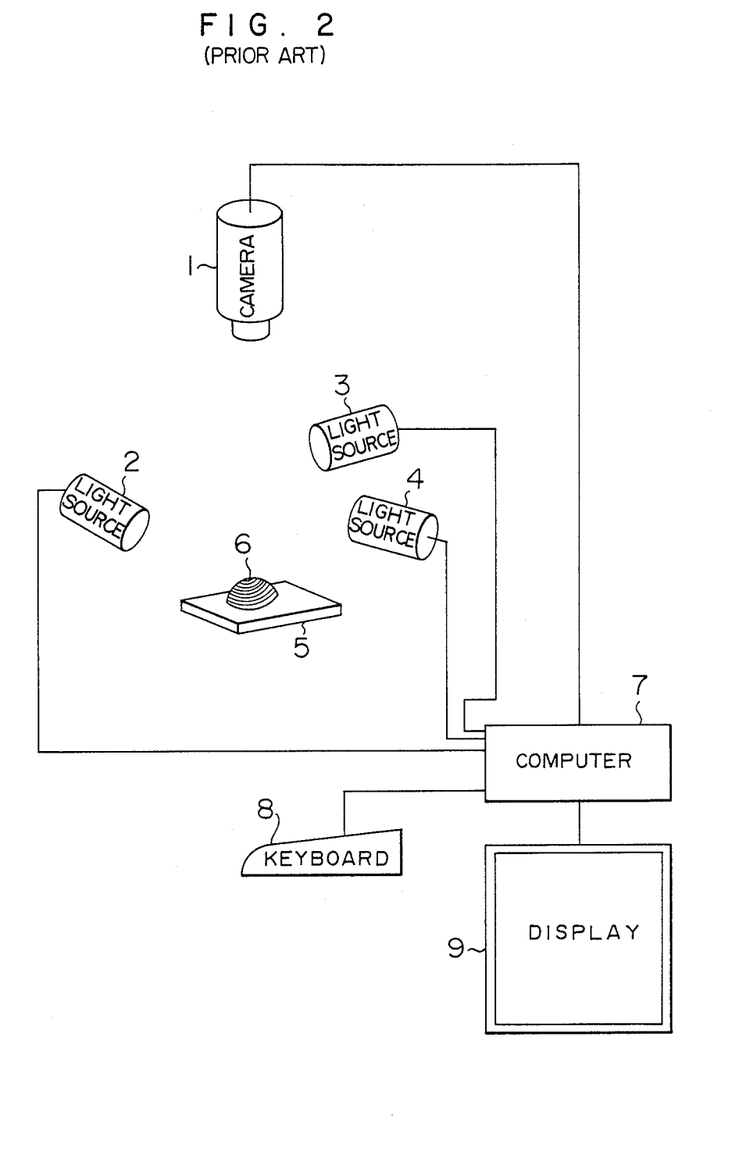
FIG. 2 is a view showing a hardware arrangement for photometric stereoscopic shape measurement to which the present invention can be applied.

FIG. 2 of the accompanying drawings shows a standard hardware arrangement for carrying out the photometric stereoscopic shape measurement. Referring to the figure, a reference numeral 1 denotes a camera for picking up the image of a specimen 6 supported on a specimen table 5 and adapted to be exchangeably illuminated by either one of light source 2, 3 or 4 at one time. In accordance with the commands inputted through a keyboard 8, a computer 7 turns on or off the light source 2, 3 or 4 and performs arithmetic operation on the information of three images supplied from the camera 1, which images are picked up by selectively turning on the light sources 2, 3 and 4, respectively, one by one. The surface shape or geometry of the specimen is thus obtained. A display 9 is adapted to display the results of the arithmetic operation or display the input images, as occasion requires. In the case of the most standard arrangement shown in FIG. 2, three light sources are employed. It should however be understood that four or more light sources may be used. Further, there is a special case in which only two light sources are employed. Besides, instead of employing a plurality of light sources, a single light source may be used, wherein the position of the light source can be varied, for example, by rotating the light source around the specimen. In any case, a common feature resides in that the positional relationship between the camera (i.e. observation point) and the specimen is fixed while the position(s) of the light source(s) is varied for picking up the images of specimen.

Figure 3:
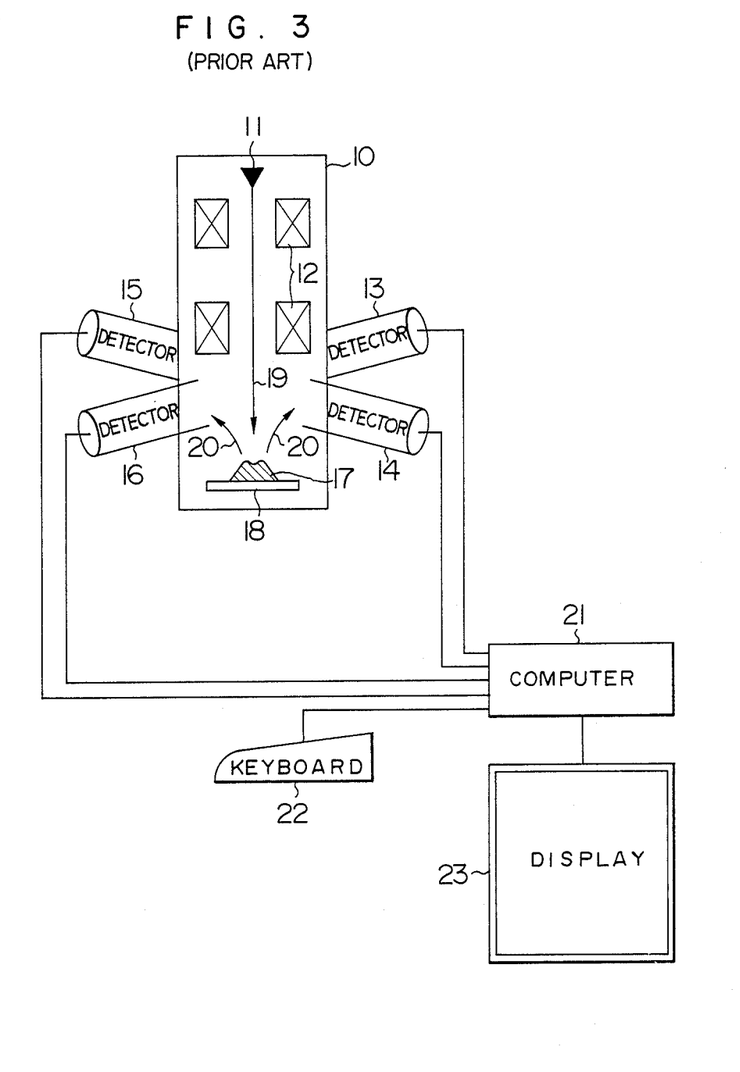
FIG. 3 is a view showing another hardware arrangement for photometric stereoscopic measurement to which the present invention can be applied.

FIG. 3 of the accompanying drawings shows a hardware structure for the photometric stereoscopic shape measurement applied to a scanning electron microscope or SEM.

Referring to FIG. 3, an electron beam 19 emitted from an electron gun 11 disposed within a lens column 10 of the SEM at a top end thereof is caused to scan a surface of a specimen 17 on a specimen table 18 through an electronic lens system 12. As a result, secondary electrons (or information carriers such as reflected electrons) 20 are emitted from the specimen to be detected by detectors 13, 14, 15 and 16. A computer 21 performs arithmetic operation on the images obtained from the detection signals under the commands inputted through a keyboard 22, the results of the arithmetic operation being displayed on a display unit 23. Referring to FIG. 2 together with FIG. 3, it will be seen that the sight direction of the camera 1 shown in FIG. 2 corresponds to the direction of the electron beam 19 shown in FIG. 3, while the light sources 2, 3 and 4 correspond to the detectors 13, 14, 15 and 16 except that four detectors are shown in the arrangement of FIG. 3 because it is a common practice to use four detectors in most of the conventional SEMs. In the light of the correspondence existing between the systems shown in FIGS. 2 and 3 as mentioned above, the same principle validly applies to both systems. Accordingly, the following description will be made in conjunction with the hardware arrangement shown in FIG. 2, assuming that the arrangement of the SEM shown in FIG. 3 can be understood by the same description.

Now, a procedure of determining the directions or orientations of the individual surface elements will be described.

As is also discussed in Ikeuchi's article cited before, brightness in appearance of an object under observation is determined by the surface material or condition and three angles formed among the sight direction, the normal direction to the surface element and the illuminating direction of the light source. In this connection, it is noted that when the method of orthogonal projection can approximately apply valid and the distance between the light source and the object is sufficiently large as compared with the size of the object, the illuminating direction of the light source can be determined independent of spacial positions of surface elements of the object. In that case, brightness in appearance of the object can be determined when the orientations of the surface elements can be determined.

Figure 4:
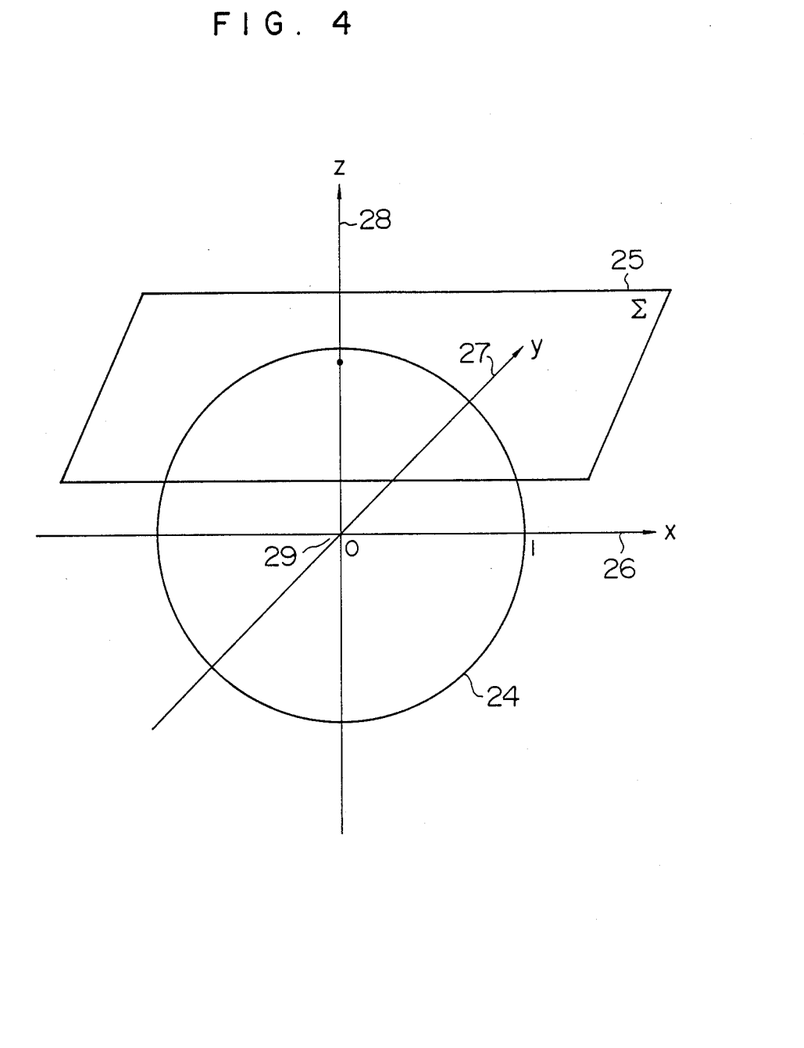
FIG. 4 is a view for illustrating a Gaussian sphere and a plane positioned in contact with the Gaussian sphere.
Figure 5A:
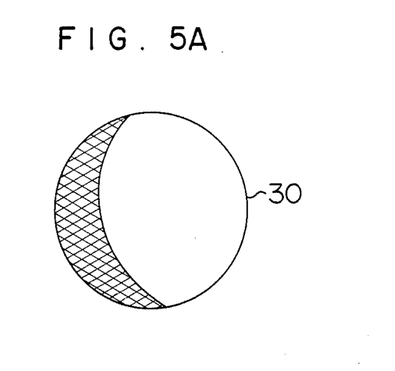
FIGS. 5A, 5B and 5C are schematic views showing, by way of example, images obtained through the photometric stereoscopic image measurement.
Figure 5B:
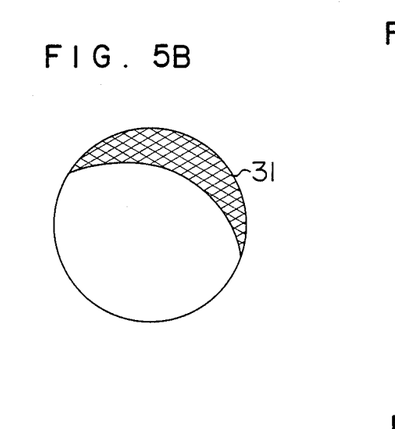
Figure 5C:
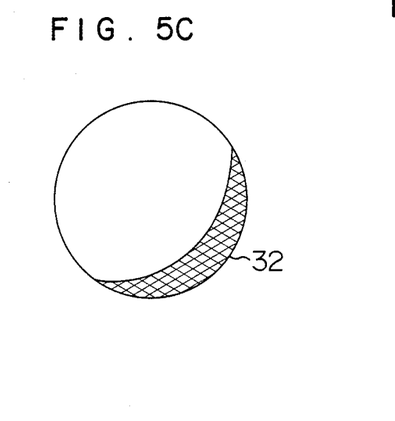
Figure 6A:
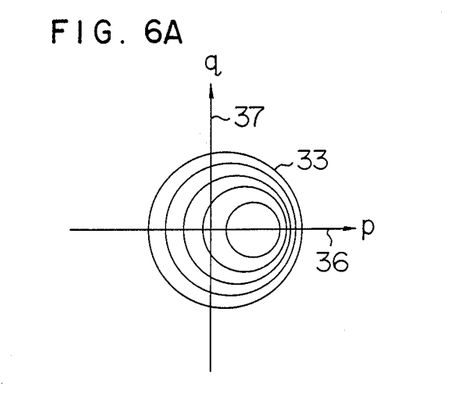
FIGS. 6A, 6B and 6C are schematic views showing reflectance map, by way of example.
Figure 6B:
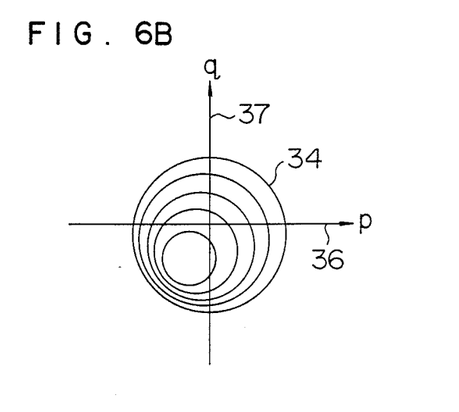
Figure 6C:
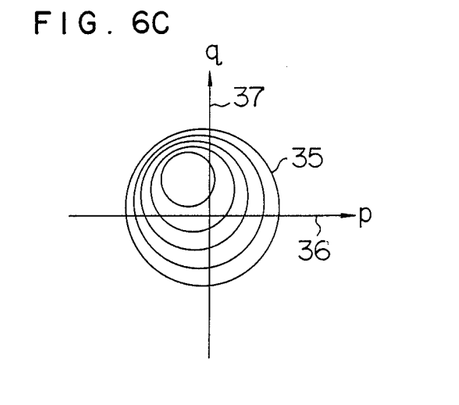
Figure 7:
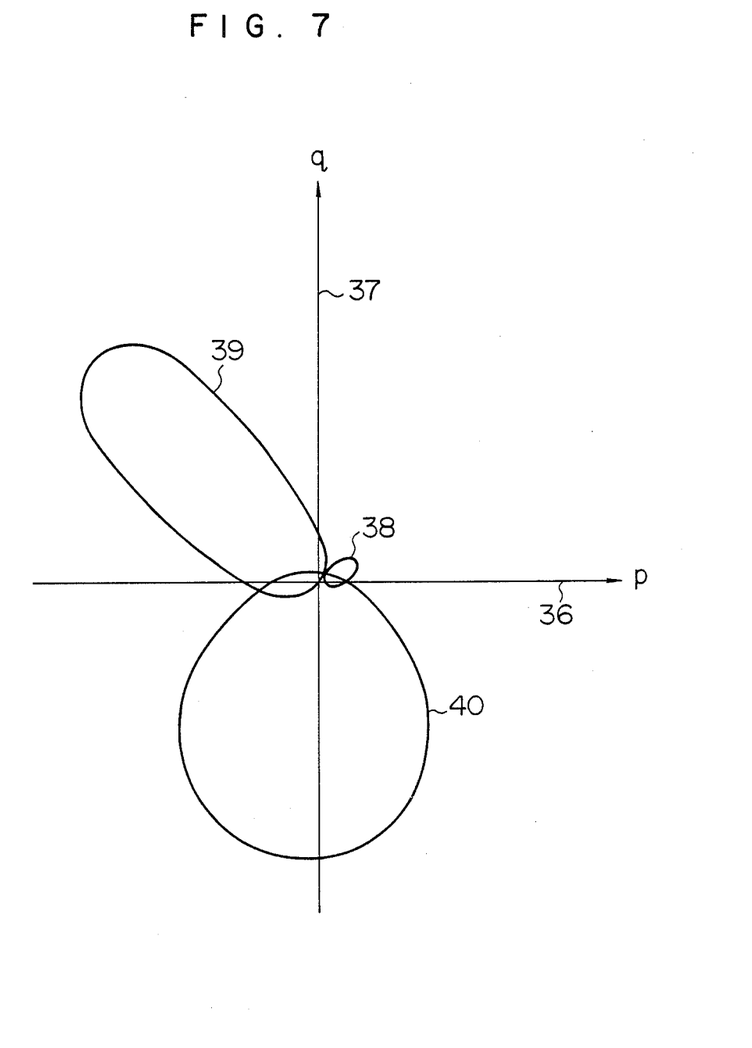
FIG. 7 is a view for illustrating determination of the direction or orientation of a surface element on a reflectance map in an ideal case.

FIG. 4 is a view illustrating a Gaussian sphere 24 having a unit radius, an orthogonal coordinate system having x-axis 26, y-axis 27, z-axis 28 and the origin (O) 29, and a plane (Σ) 25 which contacts the Gaussian sphere 24 at a point defined by x=0, y=0 and z=1 and which can be expressed by an equation where z=1. When brightness in appearance at the individual points on the sphere 24 can be determined, brightness in appearance of the individual surface elements of the object under observation can be determined as the brightness of the points on the Gaussian sphere 24 having same inclinations or orientations as those of the surface elements on the conditions assumed above. In this connection, a method of gnomonic or central projection is widely adopted according to which the spherical surface is projected to the plane (Σ) 25 with the origin (O) 29 serving as the point of sight. The result thus obtained through the central projection is referred to as the reflectance map. With the arrangement shown in FIG. 2, successive illumination of the semispherical specimen 6 of substantially Gaussian geometry, successive energization of the three light sources 2, 3 and 4 each at one time will result in three images 30, 31 and 32 shown schematically in FIGS. 5A, 5B and 5C, respectively. Referring to FIGS. 6A, 6B and 6C, the p-axis and q-axis denoted by numerals 36 and 37, respectively, are axes lying in the plane (Σ) 25 shown in FIG. 4, wherein the values or coordinates along the p-axis and q-axis represent inclination or orientation in the x- and y-axis directions of a corresponding point on the spherical surface 24 projected to the plane (Σ) 25 through the gnomonic or central projection. Consequently, a value on the reflectance map will represent the brightness of a surface element having a certain inclination or orientation. The reflectance maps corresponding to the images 30, 31 and 32 shown in FIGS. 5A, 5B and 5C are such as those shown in FIGS. 6A, 6B and 6C and designated by numerals 33, 34 and 35, respectively. As will be seen from FIGS. 6A, 6B and 6C, the reflectance map can be represented by equi-brightness contour lines (i.e. lines each interconnecting the points of same brightness) plotted about the point having the highest brightness. Assuming that brightnesses of same or corresponding points in three images of a specimen having a given shape and taken by the arrangement shown in FIG. 2 are represented by $E_1$, $E_2$ and $E_3$, respectively, these brightnesses can be represented by the corresponding equi-brightness contour lines in the respective reflectance maps. These equi-brightness contour lines plotted on a single reflectance map are then such as illustrated in FIG. 7. In the ideal case, the three equi-brightness contour lines intersect with one another at one point, whereby the direction or orientation of the surface elements under consideration can be determined. In this way, when the directions or orientations of all the surface elements can be determined, this means that the surface shape or geometry of the specimen can be determined through integration or the like processing.

It will now be understood from the above description in what manner the reflectance map is prepared by the photometric stereoscopic shape measuring method. Although the reflectance map is derived theoretically, a reflectance map prepared from the actual measurement of a typical or standard sample is also prepared for use for calibration. However, the reflectance map is very susceptible to the influence of insignificant variations in the observing conditions, difference in material of the specimen and the like variables. In the hitherto known photometric stereoscopic shape measuring method, no consideration is paid to this problem, as a result of which the result of measurement is often necessarily inaccurate.

SUMMARY OF THE INVENTION

An object of the present invention is to provide an improved photometric stereoscopic shape measuring method which is substantially immune to the drawback of the prior art and capable of automatically correcting a reflectance map on the basis of an observed image so as to accomplish the measurement of surface shape or geometry of an object under observation with an improved accuracy.

In view of the above object, it is taught according to an aspect of the present invention that three or more images are loaded for processing to generate an evaluation function which shows the extent of suitability of a reflectance map, wherein expressions defining the relationships among the images are modified or corrected so that the evaluation function assumes a minimum value, to thereby determine the direction or orientation of the surface elements.

DESCRIPTION OF THE PREFERRED EMBODIMENTS

Figure 8:
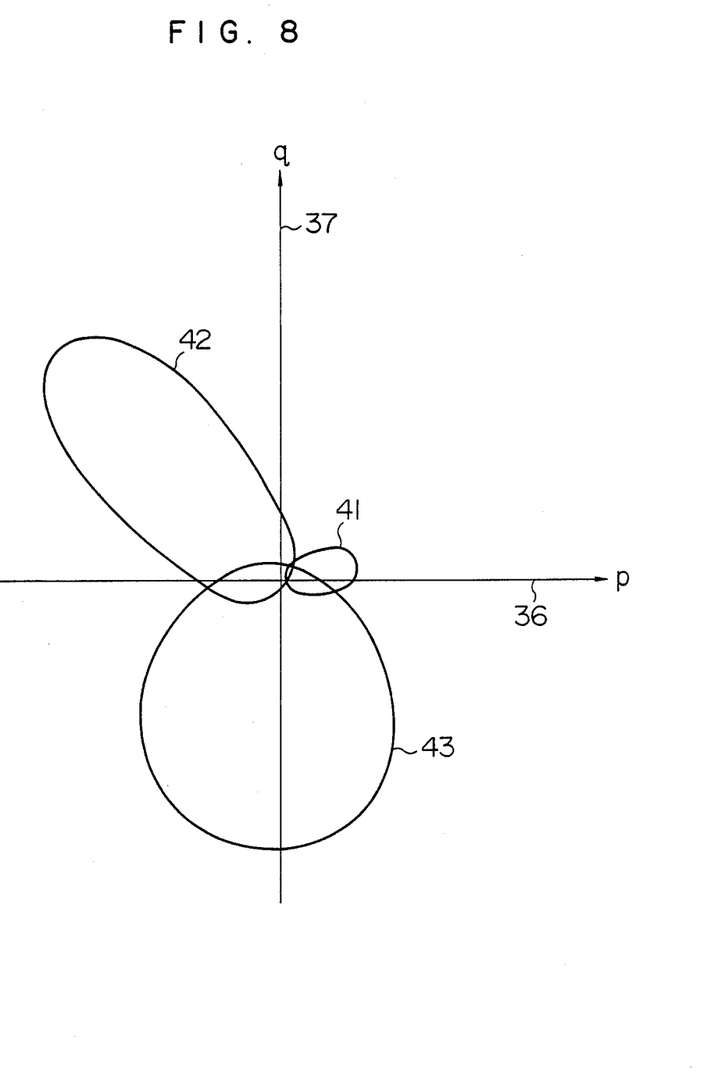
FIG. 8 and FIGS. 9A and 9B are views similar to FIG. 7 but shown in an unideal case for illustrating the principle of the invention.
Figure 9A:
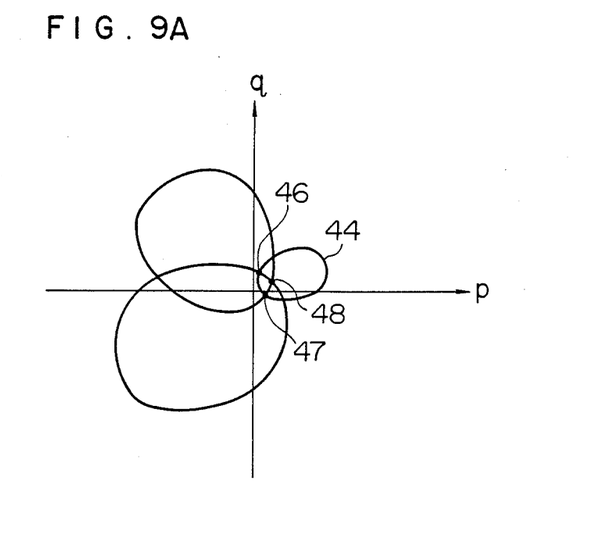
Figure 9B:
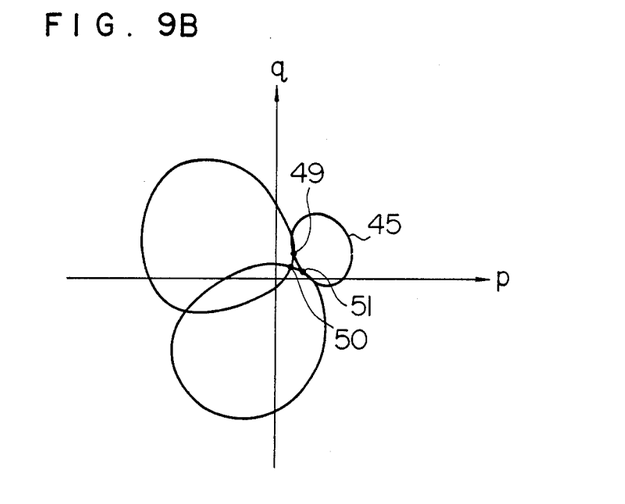

Now, the principle of the present invention will be described in detail in conjunction with exemplary embodiments thereof. FIG. 8 and FIGS. 9A and 9B are views for illustrating the principle of the present invention. As described hereinbefore, the reflectance map prepared by the hitherto known photometric stereoscopic shape measuring method is frequently inaccurate. As a result, three equi-brightness contour lines on the reflectance map obtained from the same points in three images do not intersect with one another at a single point, as is shown in FIG. 8 in which three equi-brightness contour lines 41, 42 and 43 are plotted. Theoretically, if the equi-brightness contour lines 33, 34 and 35 shown in FIGS. 6A, 6B and 6C are accurate, the equi-brightness contour lines for all the same picture elements or pixels must intersect at one point. Accordingly, if correction can be made on the equi-brightness contour lines shown in FIGS. 6A, 6B and 6C, there can be determined the orientations of the corresponding surface elements, which in turn allows ultimately the correct stereoscopic geometry to be obtained. The basic concept of the present invention therefore resides in that magnitudes of those portions shared in common among the equi-brightness contour lines 41, 42 and 43 shown in FIG. 8 are arithmetically determined for a plurality of pixels in the form of evaluation functions and that the equi-bright brightness contour lines are so corrected that the sum of the values assumed by the evaluation functions becomes minimum, to thereby cause the reflectance map to approximate the correct one as closely as possible. This procedure will be mentioned below in detail. Assuming that in the arrangement shown in FIG. 2, the light sources 2, 3 and 4 are disposed on a horizontal plane with an equal angular distance of 120° therebetween for illuminating the specimen 6, the reflectance maps plotted with the equi-brightness contour lines will be such as denoted by 33, 34 and 35 in FIGS. 6A, 6B and 6C, respectively. As will be seen, the equi-brightness contour line sets 33, 34 and 35 are then rotated by 120° on the p-q plane relative to one another. It is again assumed that the equi-brightness contour line corresponding to brightness E among those denoted by 33 in FIG. 6A is expressed by an equation $f_1(p, q) = E$, while the equi-brightness contour lines for the same brightness E among those denoted by 34 (FIG. 6B) and 35 (FIG. 6C) are expressed by functional forms $f_2(p, q) = E$ and $f_3(p, q) = E$, respectively. On the assumption, the functional forms $f_2(p, q)$ and $f_3(p, q)$ correspond to the results of coordinate transformations of $f_1(p, q)$ by 120° and 240°, respectively, on the plane (p-q). Thus, when the brightnesses of the corresponding pixels in three images of a specimen picked up by illuminating the specimen with the three light sources turned on one by one are represented by $E_1$, $E_2$ and $E_3$, then the equations of the equi-brightness contour lines corresponding to those 38, 39 and 40 in FIG. 7 are expressed by $f_1(p, q) = E_1$, $f_2(p, q) = E_2$ and $f_3(p, q) = E_3$, respectively. In the ideal case, these three equi-brightness contour lines intersect at one point, whereby the orientation of the corresponding surface element can be determined. However, the functional forms of $f_1$, $f_2$ and $f_3$ may differ from those prepared previously under the influence of changes in the observing conditions or the like, as described hereinbefore. In that case, the equi-brightness contour lines do not intersect at one point but likely to intersect in such manners as are indicated by 44 (FIG. 9A) and 45 (FIG. 9B). In the case of the equi-brightness contour line 44 as shown in FIG. 9A, overshoot occurs in the intersection. In the case of the equi-brightness contour line 45, intersection is inadequate. In this way, when the functional forms of $f_1$, $f_2$ and $f_3$ are inaccurate, the associated equi-brightness contour lines for each pixel do not intersect at one point as shown in FIG. 7. The degree of the inaccuracy can be represented by a sum of squared values of the shortest distances among the intersections, by way of example. More specifically, in the case of the example shown in FIG. 9A, the degree of inaccuracy may be given by the sum of squared values of the distances between the intersections 46 and 47, the intersections 47 and 48 and between the intersections 48 and 46, respectively. On the other hand, in the case of the example illustrated in FIG. 9B, the degree of inaccuracy can be given by the sum of squared values of distances between the intersections 49 and 50, the intersections 50 and 51 and between the intersections 51 and 49, respectively. The sums of squared distances among three points determined by a proper number of pixels in an image under observation can be utilized as evaluation functions for the functional forms of $f_1$, $f_2$ and $f_3$. By altering or modifying the functional forms of $f_1$, $f_2$ and $f_3$ so that the respective evaluation functions assume the minimum values, the orientation of the surface element can be determined accurately. For varying the functional forms, various procedures may be adopted. In the simplest case, $f_1(p, q)$, $f_2(p, q)$ and $f_3(p, q)$ may be expressed by $\alpha \cdot f_1(p, q)$, $\alpha \cdot f_2(p, q)$ and $\alpha \cdot f_3(p, q)$, respectively, where $\alpha$ represents a constant which assumes a value approximately equal to "1". By finding the value of $\alpha$ which allows the evaluation function to assume the minimum value, the reflectance map can be corrected.

Figure 1:
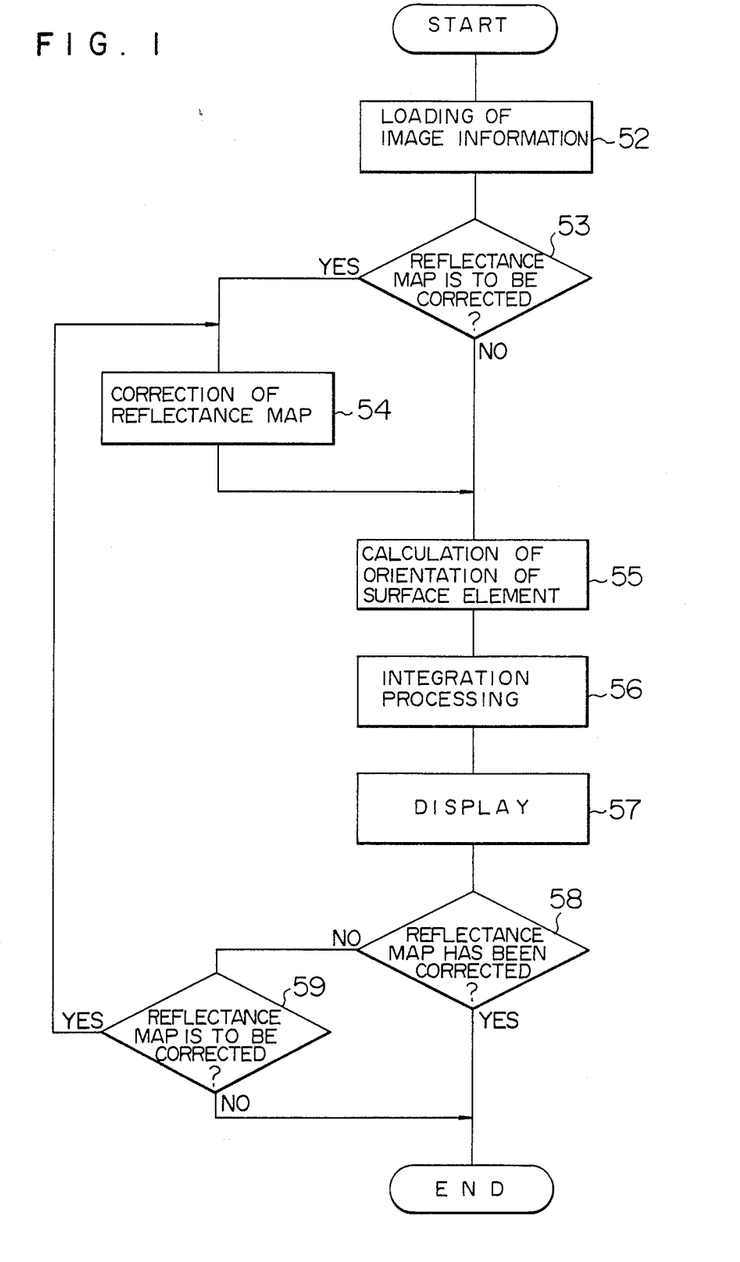
FIG. 1 is a view showing a flow chart for illustrating processing involved in carrying out the photometric stereoscopic shape measuring method according to an exemplary embodiment of the present invention.

FIG. 1 shows a flow chart for illustrating the procedure involved in carrying out the photometric stereoscopic shape measuring method capable of performing automatic correction according to an exemplary embodiment of the present invention. In this connection, it should be mentioned that the program illustrated in FIG. 1 is executed by the computer 7 shown in FIG. 2. At first, initialization is effectuated through the keyboard 8. By selectively and sequentially turning on the light sources 2, 3 and 4, three images are inputted to the computer 7 (step 52). The operator decides whether a standard reflectance map prepared previously and loaded in the system is to be used or correction is to be made (step 53). Although various measures are available to speed up the operation, the procedure for correcting the reflectance map generally requires a lot of time when compared with the time required by the arithmetic operation performed on the surface elements and the integrating processing. Accordingly, selection of the use of the standard reflectance map or correction thereof by the operator is desirable. In case the operator selects the correction of reflectance map, the correction is performed according to the method described hereinbefore (step 54). More specifically, a sum of the squared values of the shortest distances among the intersections shown in FIGS. 9A and 9B is determined to be used as the evaluation function for the functions f, while the latter are transformed into the form $\alpha \cdot f(p, q)$ in general, wherein the value of $\alpha$ x at which the evaluation function assumes a minimum value is determined by varying the value of $\alpha$. Unless the correction is desired, the standard reflectance map prepared previously is used. Then, orientation of the surface element is arithmetically determined (step 55). More specifically, orientation of the surface element is determined on the basis of the coordinates of the point at which the three equi-brightness contour lines 38, 39 and 40 intersect one another, the contour lines 38, 39 and 40 being plotted on the basis of brightness of the points which assume the same positions in the three images. By performing integration processing on the orientations of the surface elements, the surface geometry or shape of the specimen is arithmetically determined (step 56). The surface shape thus determined is displayed in the form of a bird's-eye view or by contour lines (step 57). In case the reflectance map has been corrected at the step 54, the processing comes to an end (step 58). Otherwise, the operator is requested to decide whether or not the reflectance map is to be corrected for determining again the surface shape (steps 58, 59). More specifically, the operator first determines whether or not the reflectance map is to be corrected in dependence on whether the result is to be obtained within a short time. Subsequently, the operator examines the result as to whether or not it is suitable or otherwise satisfactory. If not satisfactory, the step of correcting the reflectance map is again carried out.

The embodiment of the invention described above not only allows the measurement of the surface shape of a specimen to be carried out with a high degree of accuracy but also permits the operator to select the execution of processing for the correction of reflectance map which usually takes a lot of time, whereby effective utilization of the photometric stereoscopic shape measuring method can be accomplished.

It is apparent that the present invention can be equally applied to the SEM which is provided with a plurality of detectors and requires similar processing for the determination of surface shape of a specimen.

As will now be appreciated, the present invention makes it possible to perform the surface shape measurement with high accuracy by correcting the reflectance map, as occasion requires, by observing conditions which are likely to vary from time to time.

We claim:

1. A photometric stereoscopic shape measuring method, in which a plurality of images of an object are picked up in a fixed direction by varying the state of light source means for illuminating said specimen, to thereby determine orientations of surface elements of said object, said orientations being utilized for determining surface shape of said object, comprising the steps of: loading information of three or more images of said object, generating an evaluation function which shows the extent of suitability of a reflectance map used for determining the orientation of the surface elements, and correcting the reflectance map by correcting expressions defining relationships among said images so that said evaluation function assumes a minimum value.

2. A photometric stereoscopic shape measuring method according to claim 1, wherein said evaluation function is given in terms of a sum of squared distances between intersections of equi-brightness contour lines plotted on the reflectance map and corresponding to brightness of pixels which occupy the same positions in said plurality of images, said sum being utilized as the evaluation function for equations representative of equi-brightness contour lines for the pixels occupying the same positions in said plurality of images, respectively.

3. A photometric stereoscopic shape measuring method according to claim 1, wherein said plurality of images are derived simultaneously through a plurality of detectors installed in a scanning electron microscope.

4. A photometric stereoscopic shape measuring method according to claim 2, wherein said plurality of images are derived simultaneously through a plurality of detectors installed in a scanning electron microscope.

* * * * *